United States Patent [19]

Schumann

[11] Patent Number: 4,590,961

[45] Date of Patent: May 27, 1986

[54] MODULAR ROLLING CONDUCTOR SUPPORT

[75] Inventor: Peter R. Schumann, Milwaukee, Wis.

[73] Assignee: Cooper Industries, Inc., Houston, Tex.

[21] Appl. No.: 766,603

[22] Filed: Aug. 16, 1985

[51] Int. Cl.$^4$ .............................................. B65H 75/36
[52] U.S. Cl. .................... 137/355.16; 248/49; 59/78.1; 137/355.17
[58] Field of Search .................. 137/355.16, 355.17, 137/343; 248/49–51; 59/78.1

[56] References Cited

U.S. PATENT DOCUMENTS

| | | | |
|---|---|---|---|
| 3,053,358 | 9/1962 | Gross | 248/49 |
| 3,157,376 | 11/1964 | Merker et al. | 248/49 |
| 3,546,875 | 12/1970 | Weber | 248/49 |
| 3,566,603 | 3/1971 | Chadwick | 248/49 |
| 3,590,854 | 7/1971 | Cork | 137/355.16 |
| 3,848,407 | 11/1974 | Moritz | 59/78.1 |
| 3,921,388 | 11/1975 | Loos et al. | 248/51 |
| 4,104,871 | 8/1978 | Moritz | 59/78.1 |
| 4,129,277 | 12/1978 | Tenniswood | 248/49 |
| 4,311,293 | 1/1982 | Tenniswood | 248/49 |

*Primary Examiner*—A. Michael Chambers
*Attorney, Agent, or Firm*—Nelson A. Blish; Eddie E. Scott; Alan R. Thiele

[57] ABSTRACT

A rolling conductor support includes modular conductor carriers each having a U-shaped body and a removable retaining means. The conductor carriers are pivotably joined together by caps which delimit the range of rotation between successive conductor carriers.

The removable retaining means may be easily released by the U-shaped body without adverse effect. Separators for locating conductors within a portion of the U-shaped body also provide support against compressive loading.

13 Claims, 16 Drawing Figures

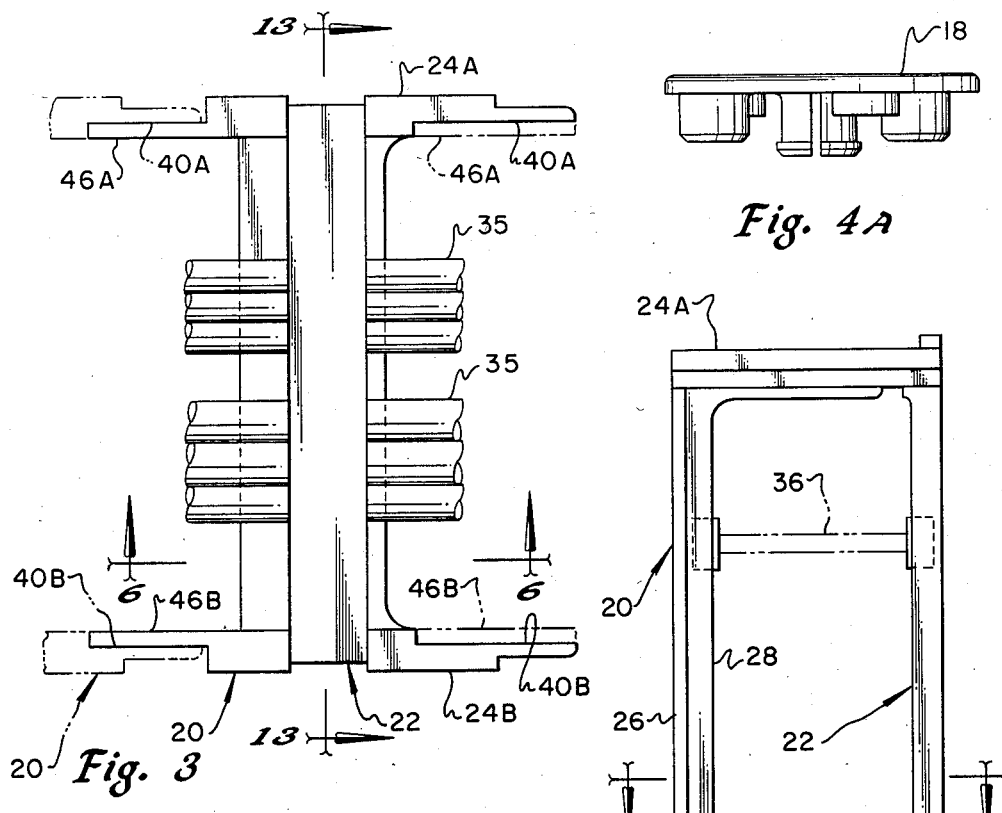
Fig. 3
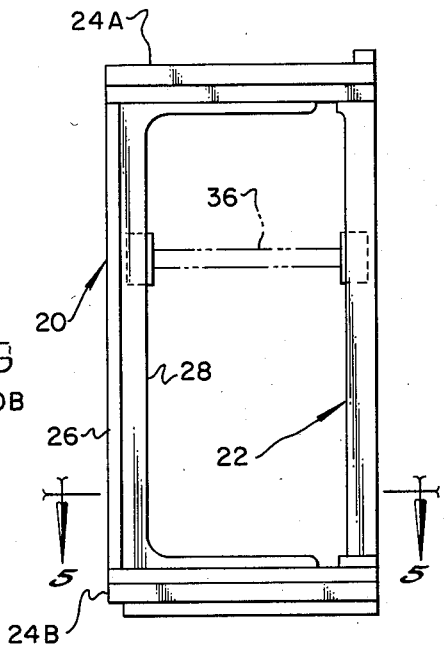
Fig. 4A
Fig. 4B
Fig. 4C
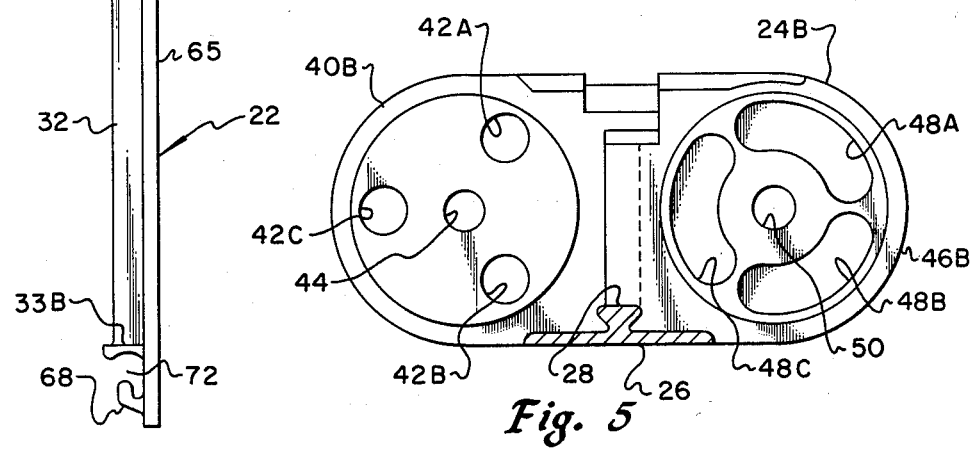
Fig. 5

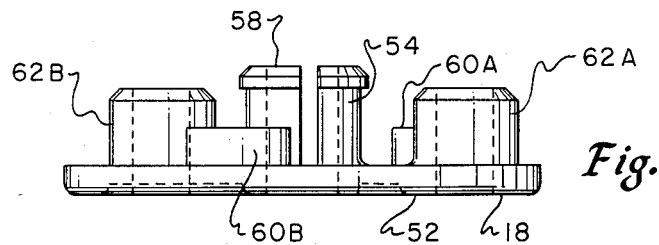
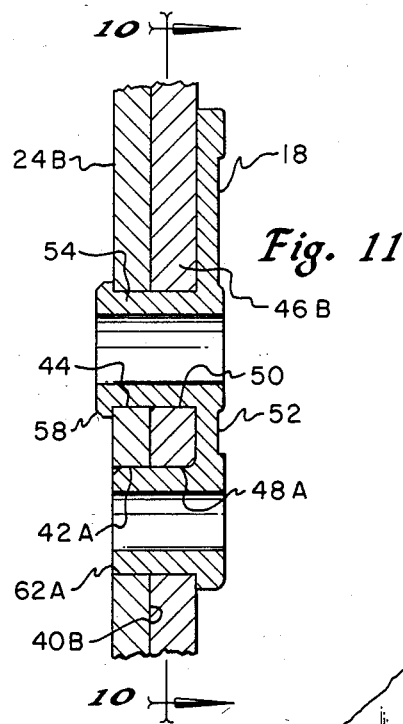
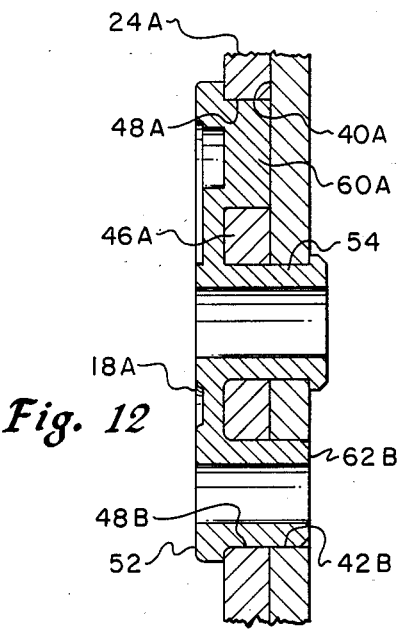
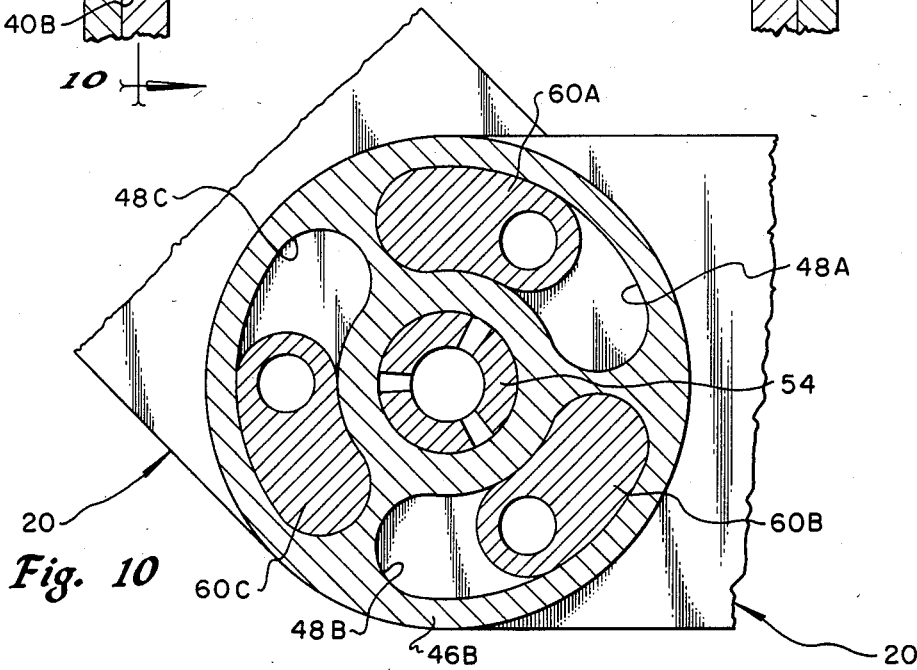

MODULAR ROLLING CONDUCTOR SUPPORT

This invention relates to rolling conductor supports and particularly relates to rolling conductor supports in which the conductor carriers are largely integral structures.

BACKGROUND OF THE INVENTION

Rolling conductor supports for supporting a flexible conductor of power between a stationary power supply and a reciprocally moving consumer of power are now well known to the art. An example of a rolling conductor support is provided by U.S. Pat. No. 3,590,854 to Cork, owned by a wholly owned subsidiary of the assignee of the present invention. The structure disclosed includes parallel chains connected together by a conductor brace. Connections between adjacent generally planar links fix the limits of rotation between the links. By limiting the rotation between adjacent links, the bending radius of the support is determined to avoid damaging the conductors. Other types of rolling conductor supports exist. Usually, rolling conductor supports only allow the conductors to bend to a limited degree in a single direction of rotation.

Modular conductor carriers fabricated from plastic are believed to have been first introduced into the United States by Kabelschlepp, a manufacturer located in Seigen, West Germany. An example of that type of enclosed modular carrier is disclosed in U.S. Pat. No. 3,664,619, and is distributed by a wholly owned subsidiary of the assignee of the present invention. The modular carrier has integral sidewalls, top, and bottom to encircle a supported conductor. A portion of the sidewalls of a carrier nest within an opposite end of a successive carrier. The nested portion of the sidewall carries an integral connecting pin which interfits within a hole of the nesting carrier to connected successive carriers. The bending radius of the support is partially fixed by an integral stop pin which abuts the end portion of the sidewall of the nesting link. Recognizing the inconvenience of threading conductors through the carriers of long conductor supports Kabelschlepp has introduced a flip top carrier.

The flip top carrier has a longitudinal hinge pin integral with a sidewall. The elongated top, which restrains the conductors within the U-shaped body, has hinged jaws at one end which firmly embrace the hinge pin. Access to the interior of the U-shaped body is achieved by snapping a notched resilient leg at the other end of the top, away from a lip on the sidewall and pivoting the top about 180 degrees through its range of free travel. Additional distinctions between the enclosed and flip top carriers exist. An integral notched reinforcing rib extends along the bottom of the U-shaped body. The rib extends upwards along the sidewalls to form a stop projection which interacts with a nested sidewall of a successive link to partially fix the bending radius of the support. A notched rib also extends from the hinge jaws, along the top to abut the sidewall carrying the lip. Neither the enclosed nor the flip top carriers are offered in large carrier sizes.

It is believed that their manufacturer has sold larger conductor supports with plastic links in Europe. The plastic KR 385 link has projecting walls which define a kidney-shaped enclosure at one end of a link. At the other end of the link, kidney-shaped projections fit within the kidney enclosures of a successive link to fix the bending radius of the support. The links in a chain are connected together by a split pin which snaps into a connecting hole of a successive link. The parallel chains forming a support are interconnected by an oval metallic conductor brace which is screwed onto the links.

Brevettato of Milano, Italy, is believed to have sold a larger size plastic link in Europe also. The Brevettato SR-308 link fixes the bending radius of the support by an internal projection cooperating with a notch in the link end of a successive link.

Cable separators having flared jaws at either end to grasp conductor retaining means have been employed to locate conductors within a region of a conductor carrier.

Typically, changing the bending radius of a conductor support has entailed modifying the sidewall or link structure of a carrier. The dimensions of pins, slots, or sidewall ends were enlarged, diminished, or they were relocated. As a result manufacturers often kept a variety of links or carriers in inventory to fill the needs of customers requiring differing bending radii.

Summary of the Invention

The present invention provides a rolling conductor support having modular conductor carriers which are identical for any desired bending radius of a support. The modular conductor carrier includes a U-shaped body and retaining means. Caps connect successive carriers, and determine the bending radius of the support. Differing caps are employed to change the bending radius of a conductor support. The U-shaped body can be fabricated in relatively large sizes, as well as the smaller sizes, of earlier plastic rolling conductor supports.

Generally, the U-shaped body is planar and includes two body sidewalls integrally connected by a body bottom. An integral notched reinforcing rib extends along the body bottom and an integral rib continues up the interior of a sidewall. Each sidewall is inwardly displaced slightly near the rib to allow a narrower portion of a carrier to nest within the wider portion of a successive carrier. Each sidewall in the narrow portion of a carrier defines a pivot orifice surrounded by three symmetrical locating orifices. In the wider portion of the carrier, each sidewall defines a pivot orifice surrounded by three arcuate slots.

The cap secures successive conductor carriers with a connecting pin which interfits the pivot orifices in the successive carrier sidewalls. Essentially, the connecting pin is a hollow tube having three longitudinal slots symmetrically defined by the tube walls. A flare at the distal end of the tube bears against the interior of the innermost sidewall to secure the carriers and cap.

Symmetrically surrounding the connecting pin, which is at the center of the circular cap, are three integral projections which are combined stop projections and locating lugs. Each projection has a kidney-shaped portion, which acts as a stop projection, and a tubular portion, which acts as a locating lug. The kidney shaped portion interfits within the arcuate slot of an outer sidewall and the tubular portion interfits within the locating orifice of an inner sidewall. The cap is fixed against rotation with respect to the inner sidewall by the locating lugs and delimits the range of rotation allowed between successive carriers by the stop projections.

The removable retaining means of the present invention releasably secures supported conductors within the U-shaped body and is removed from the body when working with the conductors. The retaining means is a generally elongated body having a notched retaining reinforcing rib extending along the greater portion of its length. Near each end of the elongated body at least one resilient leg depends to grasp the sidewalls. Preferably a pair of legs, one of which is notched to interfit with a sidewall lip and the other of which forms a flange, depend from near each end of the elongated body to grasp each sidewall. Complementary curved pivot surfaces defined by a leg and a sidewall allow one end of the restraining means to be released without unduly straining an unreleased leg at the other end of the elongated body.

Separators which are generally columnar members are employed to locate a conductor within a portion of the U-shaped body. Each separator has a resilient jaw at each end of its body which interfit the notched reinforcing rib of the U-shaped body and the notched reinforcing rib of the retaining means. In addition to locating the conductors, the separators provide support against compressive loading of the retaining means and the U-shaped body which is parallel to the axis of the separator.

This rolling conductor support is preferably manufactured from glass filled plastic to achieve lightness and economy.

BRIEF DESCRIPTION OF THE DRAWING

FIG. 3 is a top view of a portion of a conductor carrier employed in the present invention;

FIG. 4A is a side view of a cap for the conductor carrier;

FIG. 4B is a side view of the carrier body and retaining means in assembly;

FIG. 4C is a side view of the retaining means;

FIG. 5 is a partial cross section taken along line 5—5 of FIG. 4B of the interior of a U-shaped body portion of a conductor carrier;

FIG. 9 shows a side view of a cap employed in the present invention;

FIG. 10 is a cross section of a pivotal connection between conductor carriers illustrating the interaction between the cap and a sidewall of a conductor carrier;

FIG. 11 is a cross section of the pivotal connection between conductor carriers orthogonal to that of FIG. 10;

FIG. 12 is a cross section of the pivotal connection between conductor carriers taken through the opposite sidewall from that of FIG. 11.

DETAILED DESCRIPTION OF THE PREFERRED EMBODIMENT

Figure 1:
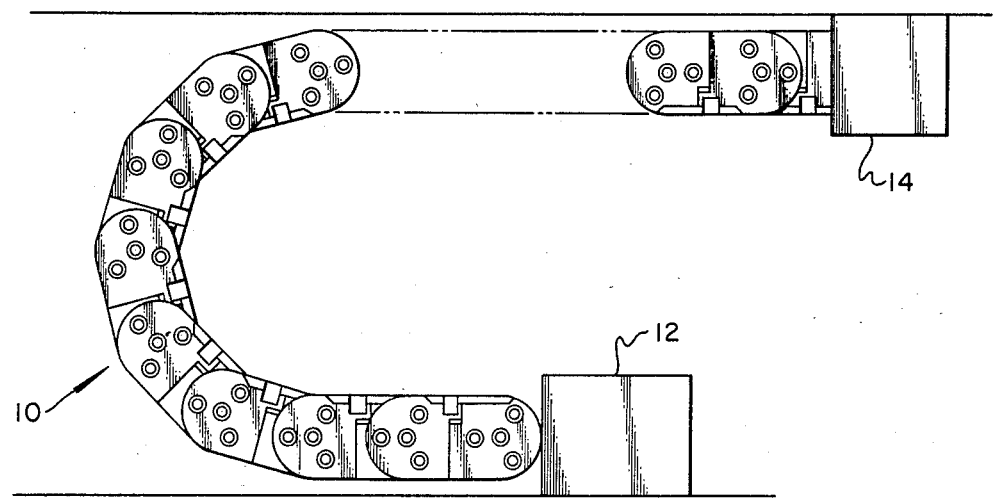
FIG. 1 shows the rolling conductor support of the present invention, in side view symbolically connected between a stationary supply of power and a movable consumer of power.
Figure 2:
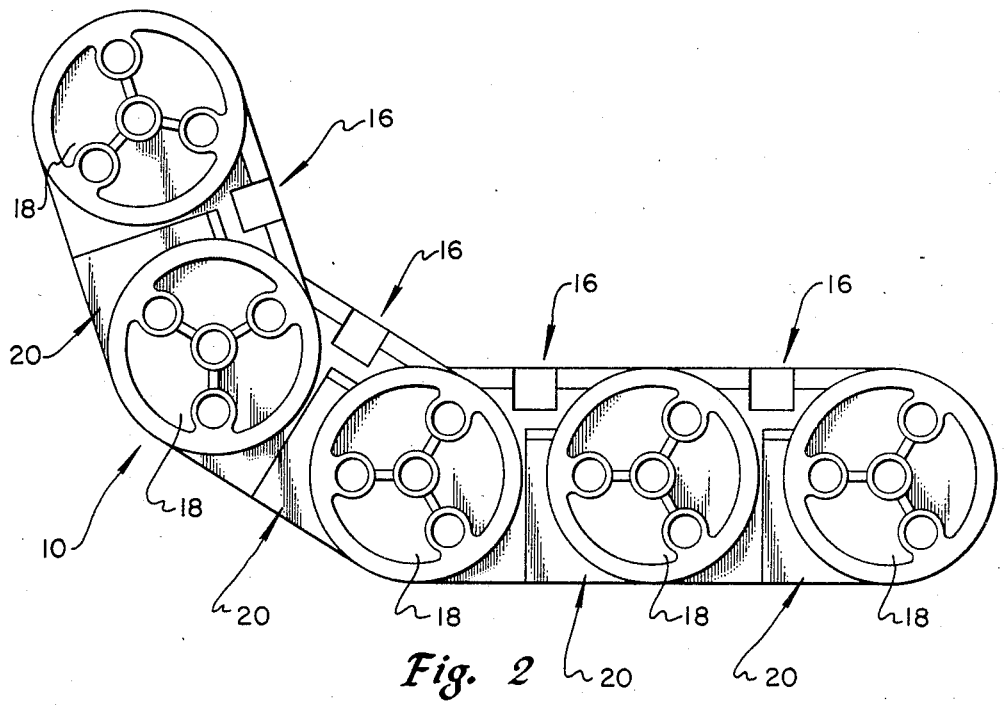
FIG. 2 is an enlarged side view of a portion of the rolling conductor support of FIG. 1.
Figure 6:
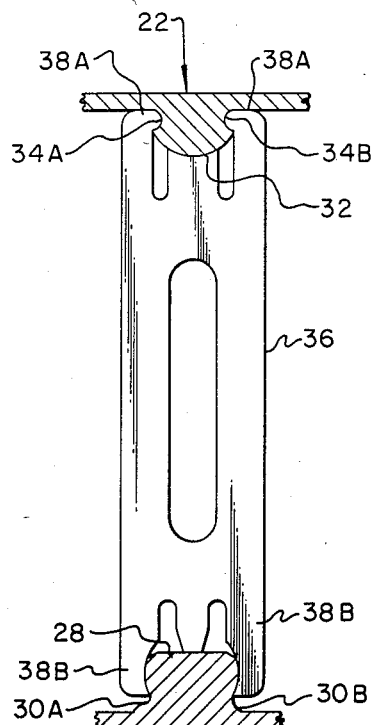
FIG. 6 is a partial cross section taken along line 6—6 of FIG. 3 of a conductor carrier and a side view of a separator employed in the invention.
Figure 7:
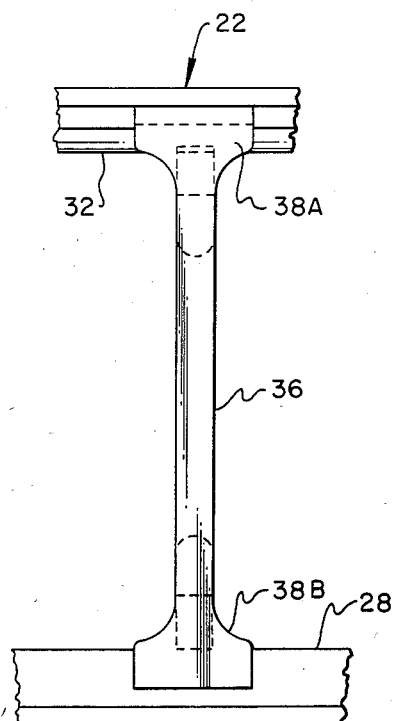
FIG. 7 is a front view of a separator and a portion of a conductor carrier.

The drawing figures are not necessarily to scale in the interest of clarity. Like parts are indicated with the same reference numerals. FIG. 1 illustrates a rolling conductor support 10 symbolically connected between a stationary power supply 12 and a reciprocatingly moving power consumer 14. As shown in greater detail in FIG. 2, rolling conductor support 10 includes a plurality of conductor carriers 16 pivotally connected to each other with caps 18. Each conductor carrier 16 includes a U-shaped body 20 and retaining means 22, as best seen in FIG. 4B. Each U-shaped body 20 comprises body sidewalls 24A, 24B integrally joined by body bottom 26. A reinforcing rib 28 extends along body bottom 26 and a portion of sidewalls 24A and 24B. As best seen in FIG. 6, reinforcing rib 28 defines notches 30A and 30B which extend longitudinally between sidewalls 24A and 24B. Similarly, retaining means 22 has a retaining reinforcing rib 32 running the length of its elongated body and between the body sidewalls 24A and 24B. The reinforcing rib 32 also defines notches 34A and 34B between retaining means sidewalls 33A and 33B, FIG. 4C. As shown in FIGS. 6 and 7, one or more separators 36 are employed to locate conductors 35 within a specific region of U-shaped body 20, and provide support against compressive loading of the retaining means 22 and the U-shaped body 20 parallel to the longitudinal axis of the separator 36. The separator 36 is a columnar like member, in its support function with opposed resilient flared jaws 38A and 38B at respective ends of the separator. The jaws 38A and 38B are adapted to interfit in notches 34A and 34B, and 30A and 30B, respectively.

FIG. 5 is a partial cross section of the U-shaped body 20 from the interior. Sidewalls 24A and 24B are identical. At a first nested end 40B of sidewall 24B, three locating orifices 42A, 42B, 42C symmetrically surround first pivot point orifice 44. As best seen in FIG. 3, sidewalls 24A and 24B are slightly displaced in the region of reinforcing rib 28 allowing first nested end 40A and 40B of sidewalls 24A, and 24B to be nested within second nesting end 46A and 46B of a successive conductor carrier body. Sidewall 24B defines three arcuate slots 48A, 48B, and 48C symmetrically surrounding second pivot orifice 50 at the second nesting end 46B of sidewall 40B.

Figure 8A:
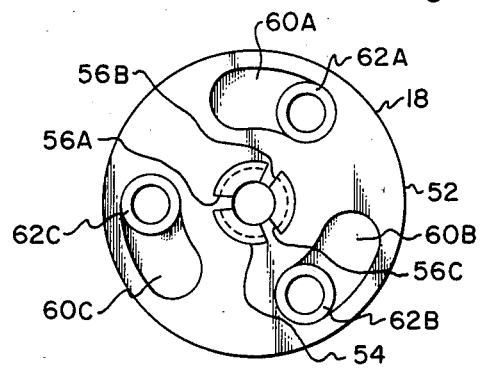
FIGS. 8A and 8B show front views of the caps employed to pivotally join the conductor carriers of the present invention.
Figure 8B:
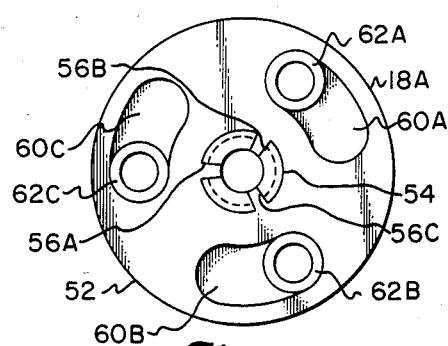

Caps 18 and 18A for pivotally joining successive conductor carriers 16 are best illustrated in FIGS. 8A, 8B, and 9. Cap 18, FIG. 8A and FIG. 9, includes a circular base 52 which carries four projections. Connecting pin 54 centrally projects from circular base 52. Connecting pin 54 is generally a hollow tubular member with three longitudinal slots 56A, 56B and 56C, FIG. 8A, through its tubular wall and which extend from a flared distal end 58 of connecting pin 54 towards the circular base 52. Symmetrically surrounding connecting pin 54 are three integral projections which are combined stop projections 60A, 60B and 60C, and locating lugs 62A, 62B, and 62C. Cap 18 is inserted from the outside of the conductor carriers 16 to connect successive conductor carrier bodies 20 together. FIG. 8A and 8B illustrate that in opposing caps 18 and 18A stop projections 60A, 60B and 60C must be disposed in opposite directions from locating lugs 62A, 62B, and 62C, to allow stop projections 60A, 60B, and 60C to interfit arcuate slots 48A, 48B, and 48C of sidewalls 24A and 24B.

FIG. 10, 11, and 12 best illustrate the interaction among caps 18 and 18A and the sidewalls 24A and 24B of successive conductor carriers 16 to pivotally connect them and to limit their range of rotation relative to each other. Connector pin 54 is inserted through second pivot orifice 50 in second nesting end 46B and through first pivot orifice 44 of first nested end 40B of adjacent bodies 20. Flared distal end 58 of connecting pin 54 interlocks with the surface of sidewall 24B to releasably secure the assembly together. Locating lug 62A passes through arcuate slot 48A and interfits into locating orifice 42A to restrain cap 18 from rotating with respect to locating orifice 42A. Similarly, the other locating lugs 62B and 62C interfit with locating orifices 42B and 42C. FIG. 12 shows a cross section of the pivotal connection between conductor carriers 16 through a slightly offset or rotated section line. In particular, it illustrates stop projection 60A of cap 18A extending into arcuate slot 48A of sidewall 24A at its second nesting end 46A. FIG. 10 best illustrates the interaction between stop projections 60A, 60B and 60C and arcuate slots 48A, 48B, and 48C, which delimit the range of rotation between successive conductor carriers 16.

Figure 13:
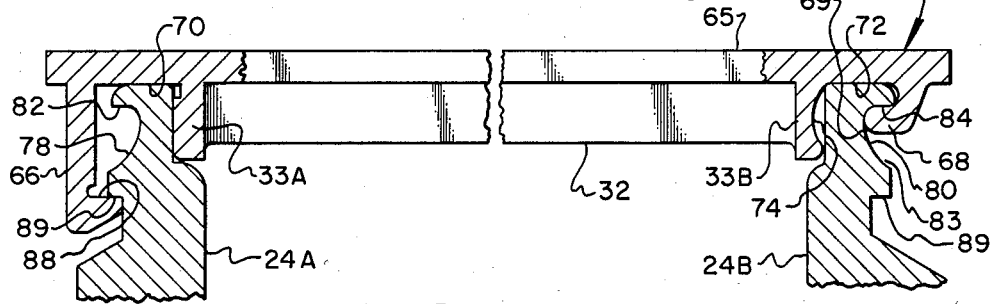
FIG. 13 is a section view taken along line 13—13 of FIG. 13 and illustrates an enlarged preferred detail of retaining means employed in the present invention.

Referring now to FIGS. 4C and 13, in particular, the retaining means 22 comprises an elongated body 65 having a resilient deflectable leg 66 extending from one end and a projection forming a flange 68 extending somewhat in the same direction as the leg 66 at the other end. The leg 66 is spaced from sidewall 33A to form a slot 70 and the flange 68 is spaced from sidewall 33B to form a slot 72. The slot 72 is defined in part by a concave curved surface 74 of the sidewall 33B. The upper edges of the sidewalls 24A and 24B are each provided with recesses 78 and 80, respectively, which define retaining lips 82 and 84. As illustrated in FIG. 13, the recess 80 includes a curved surface 83 joining the lip 84 and cooperable with a convex curved edge 69 of the flange 68. The resilient leg 66 includes a latching edge 88 which is cooperable with a surface 89 formed on the sidewall 24A and extending generally parallel to the lip 82. The sidewalls 24A and 24B may be of generally identical configuration in their upper regions or distal ends as illustrated in FIG. 13 so that the retaining means 22 can be secured to the body 20 by engaging the flange 68 into either the recess 78 or the recess 80 and snapping the distal end of the resilient leg 66 into engagement with the surface 89. Thanks to the curved surfaces 83 and 69 formed, respectively, on the flange 68 and on the upper portion of the sidewall 24B, the retaining means 22 may be pivoted about the connection between the sidewall 24B and the flange 68 without unduly straining the flange while the leg 66 is being snapped into or out of engagement with the sidewall 24A.

The respective parts of the rolling conductor support 10 described herein are preferably fabricated from glass filled plastic to reduce weight and manufacturing cost. Preferably a 30% glass fill having 3/16 inch by 1/16 inch glass fibers is utilized.

Although a preferred embodiment of the invention has been described herein in detail, those skilled in the art will recognize that various substitutions and modifications may be made to the embodiment disclosed without departing from the scope and spirit of the appended claims.

What I claim is:

1. A modular rolling conductor support comprising:
a plurality of pivotally connected conductor carriers which are connectable between a stationary energy supply and a moving energy consumer wherein each conductor carrier includes; a body having a generally planar body bottom and two body sidewalls with an integral body reinforcing rib extending at least along said body bottom, each body sidewall defining a plurality of locating orifices surrounding a first pivot point at a first end of the sidewall and a plurality of arcuate slots surrounding a second pivot point at a second end of the sidewall;
removable retaining means releasably maintaining the supported conductors within said rolling conductor support; and
a cap for releasably securing the first end of a body sidewall to the second end of a body sidewall in a successive conductor carrier, and for delimiting the range of pivotal movement between successive conductor carriers by means of integral stop projections which interfit within the arcuate slots.

2. A modular rolling conductor support as claimed in claim 1 wherein:
said body sidewall defines a first pivot orifice at the first pivot point and a second pivot orifice at the second pivot point;
said cap includes a connecting pin resiliently interfitting into the pivot orifices defined by the body sidewall of successive conductor carriers; and
said retaining means is a generally elongated planar member adapted to resiliently grasp body sidewalls for releasably restraining conductors.

3. A modular rolling conductor support as claimed in claim 2 wherein:
each said body sidewall defines locating orifices symmetrically surrounding the first pivot point and arcuate slots symmetrically surrounding the second pivot point;
said cap includes an integral connecting pin which is adapted to form a snap fit with the pivot orifices and a plurality of stop projections symmetrically surrounding the connecting pin, said stop projections delimiting the limits of rotation within the arcuate slots.

4. A modular rolling conductor support as claimed in claim 3 wherein:
said connecting pin is generally a hollow tubular member with at least one longitudinal slot in the tube wall extending from a flared distal end of said pin; and
said cap further includes, integral locating lugs which interfit within the locating orifices of said body sidewall in a manner to cause said cap to be rotatably fixed with respect to the locating orifices.

5. A modular rolling conductor support as claimed in claim 4 wherein:
said body of each conductor carrier has body sidewalls adapted at one end to overlap the body sidewalls of a successive identical conductor carrier at a second end of the body sidewalls of said successive conductor carrier; and
said locating lugs and said stop projections of said cap partially coincide.

6. A modular rolling conductor support as claimed in claim 1 wherein:
said body further defines a retaining surface adjacent the distal end of at least one of said body sidewalls; and said retaining means comprises a generally elongated member with a depending notched resilient leg near one end of the elongated member, the notched end of said leg interfitting with said retaining surface of said body sidewall to releasably restrain the conductors carried within said conductor carriers.

7. A modular rolling conductor support as claimed in claim 6 wherein:

the other of said body sidewalls includes a retaining lip having a generally flat surface at least generally parallel to said body bottom; and said retaining means further includes means forming a flange opposite said resilient leg adapted to engage said retaining lip.

8. A modular rolling conductor support as claimed in claim 7 wherein:

said other body sidewall defines a curved surface adjacent said retaining lip, and said flange defines a complementary pivot surface to complement the curved pivot surface and provide bearing surfaces allowing said retaining means to be released from securement with a body sidewall near one end and partially pivoted about the second end without straining said flange.

9. A modular rolling conductor support as claimed in claim 8 wherein:

said retaining lip extends outwardly from said body;

said other body sidewall defines a curved pivot surface which is concave into the exterior of said other body sidewall beneath said retaining lip; and said resilient leg locates said flange in engagement with said pivot surface.

10. A modular conductor support as claimed in claim 1 wherein:

said body reinforcing rib is notched along portions of its longitudinal extension between body sidewalls;

said retaining means is a generally elongated member adapted to resiliently grasp said body sidewalls and includes a retaining reinforcing rib extending longitudinally along said elongated member between said body sidewalls, said retaining reinforcing rib is notched along portions of its longitudinal extension which generally align with said notches in said body reinforcing rib; and said conductor support further includes a separator comprising a member having a resilient flared jaw at each end, said resilient jaws adapted to interfit a notch of said ribs, respectively, said separator adapted to locate a conductor within a portion of said body and provide support for compressive loading of said retaining means and body generally parallel to the axis of the separator.

11. A modular rolling conductor support comprising:

a plurality of pivotally connected conductor carriers which are connectable between an energy supply and an energy consumer wherein each conductor carrier includes a body having a body bottom and two body sidewalls, a retaining surface adjacent the distal end of at least one of said body sidewalls, the other of said body sidewalls including a retaining lip having a generally flat surface;

means for releasably securing a first end of a body sidewall to a second end of a body sidewall in a successive conductor carrier and for delimiting the range of pivotal movement between successive conductor carriers; and removable retaining means releasably maintaining supported conductors within said rolling conductor support, said retaining means comprising a generally elongated member with a depending notched resilient leg near one end of the elongated member, the notched end of said leg interfitting with said retaining surface of said one body sidewall to releasably restrain the conductors carried within said conductor carriers, and said retaining means further includes means forming a flange opposite said resilient leg adapted to engage said retaining lip.

12. A modular rolling conductor support as claimed in claim 11 wherein:

said other body sidewall defines a curved surface adjacent said retaining lip; and said flange defines a complementary pivot surface to complement the curved surface and provide bearing surfaces allowing said retaining means to be released from securement with said one body sidewall and partially pivoted about the second end without straining said flange.

13. A modular rolling conductor support as claimed in claim 12 wherein:

said retaining lip extends outwardly from said body;

said other body sidewall defines a curved pivot surface which is concave into the exterior of said other body sidewall beneath said retaining lip; and said resilient leg locates said flange in engagement with said pivot surface.

* * * * *